Oct. 25, 1938.  E. L. SAVAGE  2,134,647
GRASS PLOT FOUNDATION
Filed Oct. 10, 1936
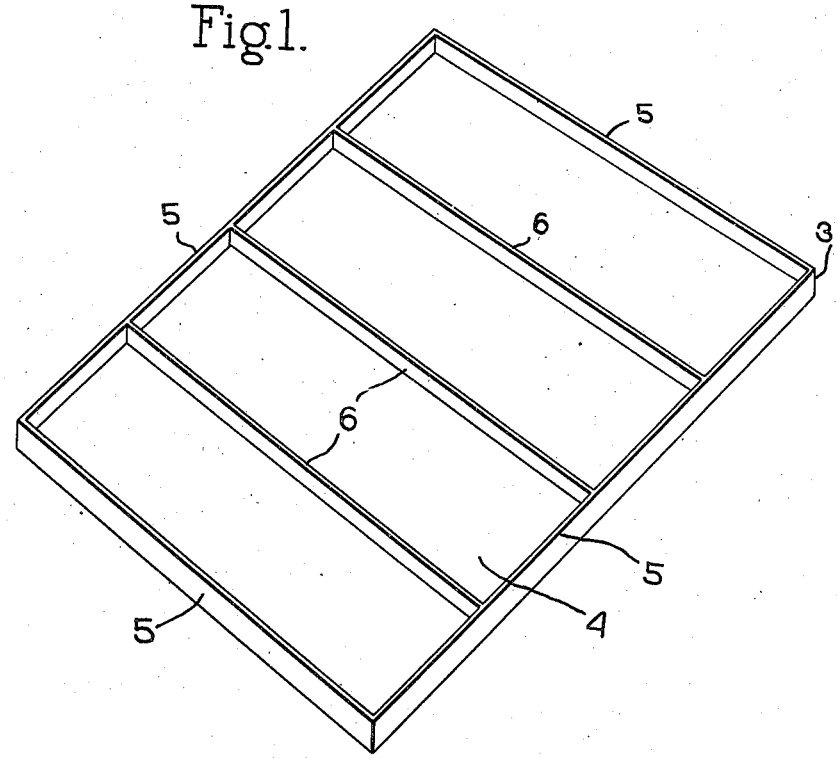
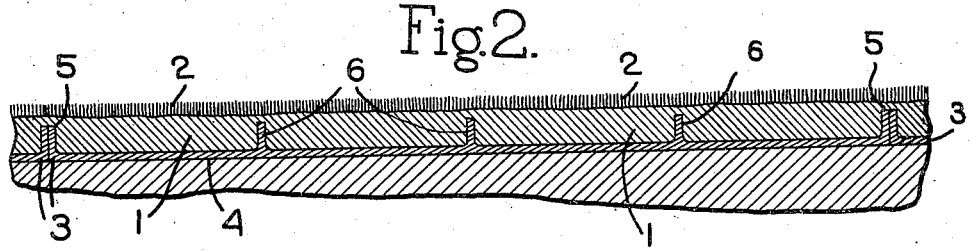
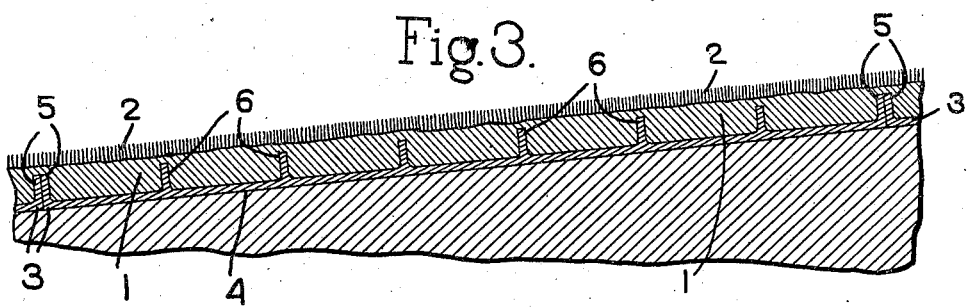
Inventor.
Ernest L. Savage
by Heard Smith & Tennant.
Attys.

Patented Oct. 25, 1938

2,134,647

UNITED STATES PATENT OFFICE 2,134,647

GRASS PLOT FOUNDATION

Ernest L. Savage, Watertown, Mass.

Application October 10, 1936, Serial No. 105,034

1 Claim. (Cl. 47—48)

This invention relates to portable foundations for grass plots and has for its object to provide a novel foundation which is portable and can be readily installed in a lawn or on a putting green of a golf course or other similar place, and which will prevent the moisture in the soil from draining away from the grass roots and hence will assist in retaining such moisture within reach of the grass roots.

The invention is of special utility in locations where the soil is sandy and where any water which is deposited on the surface of the earth, either in the form of rain or in the form of water sprayed from a sprinkler, would normally drain away quickly beyond the reach of the grass roots. When installed in such a location my improvements prevent the draining away of the water or moisture and thus provide conditions conducive to luxuriant growth of grass.

My improvements consist in the use of one or more portable tray-like devices, each having a bottom and side walls which are embedded in the soil below the level to which the grass roots extend. When thus installed each tray-like device constitutes a barrier or dam which prevents any water deposited on the surface of the earth from draining downwardly below the level where it can be reached by the grass roots so that whenever a shower occurs or the lawn is sprinkled the water will be held at the surface of the earth within reach of the grass roots. These tray-like members can be made in any suitable size and any desired number of them may be used depending upon the area of the grass plot to be equipped with my improvements.

If the grass plot is on a slope then the tray-like members may be equipped with transversely-extending ribs which serve to hold the water at different levels.

In order to give an understanding of the invention, I have illustrated in the drawing a selected embodiment thereof which will now be described after which the novel features will be pointed out in the appended claim.

In the drawing:

Fig. 1 is a perspective view of a tray-like member such as might be used in the practise of my invention.

Figs. 2 and 3 are vertical sectional views through grass plots to which my invention has been applied, Fig. 3 illustrating a grass plot having a steeper slope than that shown in Fig. 2.

In the drawing 1 indicates the soil of a grass plot and 2 the grass growing thereon.

Where the soil 1 is of a sandy nature any water deposited thereon either naturally or artificially will rapidly drain downwardly beyond the reach of the roots of the grass 2.

In order to prevent such rapid draining of the water I propose to embed in the earth below the grass roots a tray-like member which constitutes a barrier or dam that holds the water at the surface of the soil. This barrier or dam may have various shapes and sizes, but I will preferably make it in the form of a tray 3 having the bottom 4 and side walls 5. This tray may be made of any suitable material such as cement or wood or sheet metal, but I will preferably employ some suitable material such as cement which will not deteriorate when buried in the earth for a long period of time.

The tray 3 is placed in the earth or soil at a sufficient depth so that it is below the roots of the grass 2 thereby providing a sufficient depth of soil 1 above the tray for properly growing grass or other vegetation.

Where the invention is to be used with relatively large plots of grass, then a plurality of these trays will be sunken or embedded in the earth with the trays arranged in abutting relation so that there will be provided in the soil throughout the entire extent of the grass plot a suitable barrier or dam which will prevent the rapid draining of moisture downwardly away from the grass roots. With this invention, therefore, a relatively small amount of watering or sprinkling of the grass will keep it in a luxuriant state, because all the water which is deposited on the grass is retained in the body of soil 1 above the tray 3 and at a point where the roots of the grass can readily reach it.

If the grass plot is on a slope I may provide the tray with ribs 6 extending across the tray in a direction at right angles to the slope, as shown in Figs. 2 and 3. These ribs prevent the water from draining to the lower part of the tray and serve to hold the water in the upper part of the tray. The number of ribs in the tray may vary according to the slope of the lawn or grass plot. A tray which is used in a grass plot having a relatively steep slope as shown in Fig. 3 should have more ribs 6 than a tray used in a grass plot having a gentle slope as shown in Fig. 2. In either case, however, the ribs serve to keep the moisture evenly distributed throughout the tray.

The tray 3 may be built in situ or may be built at a point remote from the place where it is to be installed and brought to the place completely made, but in either case the installation of the tray requires that the soil should be excavated to the desired depth, after which the tray can be installed and then filled to the required level with suitable soil or other material.

While I have illustrated a selected embodiment of my invention, yet I do not wish to be limited to the constructional features shown.

I claim:

A grass plot foundation formed by a portable one-piece integral tray-like member having imperforate bottom and side walls and having an open unobstructed top and also having relatively thin imperforate ribs rising from the bottom, which ribs extend across the member from one side to the opposite side and having substantially the same vertical dimension as that of the side walls, said tray-like member being embedded in the earth at a point immediately below the roots of the grass and being filled with the earth containing the grass roots, said member providing a barrier against the drainage downwardly of surface water whereby the soil in and above the tray will be kept moist.

ERNEST L. SAVAGE.